July 28, 1942.                E. B. ANDERSON                2,291,436
UNIVERSAL JOINT MANUFACTURE
Filed Nov. 17, 1939
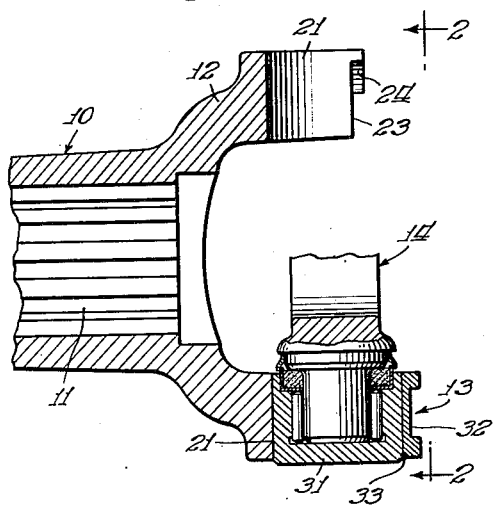
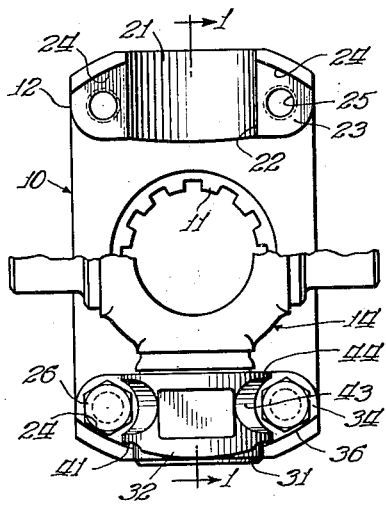
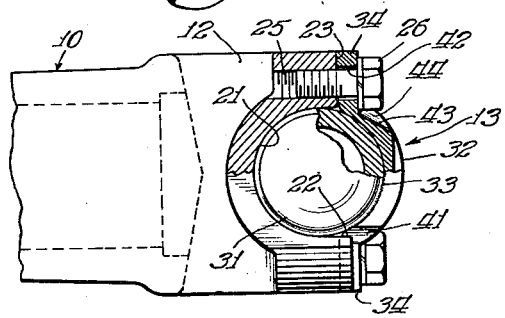
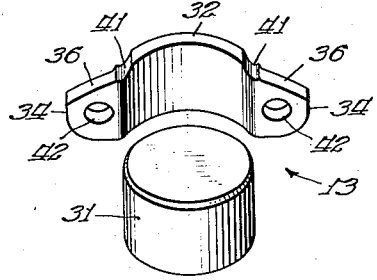
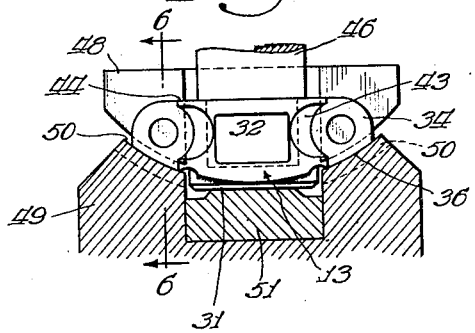
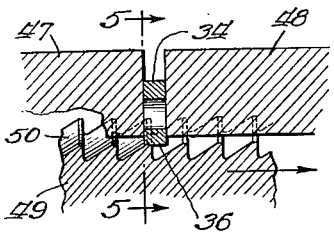
Inventor:
Edmund B. Anderson
By Edward C. Gritzbaugh
Atty.

Patented July 28, 1942

2,291,436

UNITED STATES PATENT OFFICE 2,291,436

UNIVERSAL JOINT MANUFACTURE

Edmund B. Anderson, Rockford, Ill., assignor to Borg-Warner Corporation, Chicago, Ill., a corporation of Illinois Application November 17, 1939, Serial No. 304,911

2 Claims. (Cl. 29—148)

This invention relates to universal joints and more particularly to an improved yoke and bearing cup assembly and method of fabricating the same.

It is a general object to provide a yoke and bearing cup assembly having improved features resulting in a lower cost of manufacture, increased efficiency of operation, and increased efficiency in the assembly and disassembly thereof.

It is an object to provide an improved method of fabricating a bearing cup and attaching strap assembly effecting a saving in both material and labor cost.

More specifically it is an object to provide a method of fabricating a bearing cup and attaching strap assembly wherein economy of both material and labor is realized through the use of hard metal for one element and relatively soft metal for the other, all machining operations being performed on the element of softer metal.

Still another object is the provision of an improved construction of bearing cup and attaching strap assembly wherein the locating surfaces of the assembly are all formed on the strap leaving the bearing cup free from any machining operation.

It is an object to provide an improved method of fabricating a universal joint bearing cup attaching strap.

Another object of this invention is the provision of an improved construction of yoke member for the reception of bearing cup assemblies.

A further object is the provision of an improved construction of bearing yoke and bearing cup assembly wherein there is provided arcuate locating shoulders between said elements disposed in a more optimum position with reference to balance and load strain.

The above and other objects, advantages and uses of my invention will become more apparent from a reading of the following specification and claims taken in connection with the appended drawing which forms a part of this specification and wherein:

Fig. 1 is an axial cross-section of part of a universal joint incorporating a preferred embodiment of my invention and is taken substantially on the line 1—1 of Fig. 2;

Fig. 2 is an end view of the structure shown in Fig. 1 and is taken substantially on the line 2—2 of Fig. 1;

Fig. 3 is a broken away sectional view showing to advantage my improved construction of bearing cup and attaching strap;

Fig. 4 is an exploded view of the strap and bearing cup showing these parts before the same are welded together;

Fig. 5 is a schematic view of a preferred arrangement for machining the arcuate surfaces on the straps and is taken substantially on the line 5—5 of Fig. 6; and Fig. 6 is a section view taken substantially on the line 6—6 of Fig. 5.

Referring in greater detail to the figures of the drawing, a universal joint yoke 10 is internally splined at 11 for connection with a complementarily formed shaft (not shown) and provided with a pair of diverging arms 12 each of which is formed in a novel manner for the reception of a pair of novel bearing cup and strap assemblies indicated generally at 13 between which there is received one pair of oppositely extending trunnions of a four trunnion spider 14, the other pair of which is arranged to be received in the bearings of a second yoke member (not shown).

My invention has to do specifically with the novel formation of the outer ends of yoke arms 12 and the novel construction of the bearing cup and strap assembly indicated generally at 13 as well as the novel method employed in fabricating this bearing cup and strap assembly.

Each of the arms 12 are formed in the outer portion thereof with arcuate recesses 21 open in the axial direction facing away from the arms. These recesses are complementary in shape to one half of the bearing cups which they are arranged to receive and have a depth slightly greater than the outside radius of such cups. Arcuate recess 21 merges with substantially or diverging surfaces 22 terminating in flat transverse attaching surfaces 23. For the purpose of determining the radial limit position of the bearing cup there are formed on each of the surfaces 23 arcuate locating shoulders 24. In order to properly center each of these shoulders, I prefer to form the same by placing yoke members on a suitable machine and turning the same about the axis thereof while forming shoulder 24 with a suitable cutting tool. Formed in the face of each of the surfaces 23 is an axially extending threaded orifice 25 for the reception of suitable fastening cap screws 26 as will appear.

My improved bearing cup and attaching strap assembly indicated generally at 13 comprises a hardened steel bearing cup 31 and a relatively soft readily machinable metal strap 32 having a central arcuate portion welded to the side wall of the bearing cup as indicated at 33 and having outwardly extending end portions forming ears 34 received in engagement with attaching surfaces 23.

Particular attention is drawn to the fact that ears 34 are formed with arcuate surfaces 36 complementary in shape to and received in engagement with locating shoulders 24. It will be noted that these arcuate surfaces 36 are disposed axially between the ends of bearing cup 31 and are formed entirely on the ears 34 there being no engagement of the bearing cup with the locating shoulders 24. The positioning of the locating surfaces 24 and 36 at a position axially between the ends of the bearing cup is considered as greatly improving the balance of torque load stresses. The forming of the arcuate positioning surfaces 36 entirely on the ears 34 makes it possible to avoid any machining operation on the bearing cup proper. There are at least two important reasons why it is desirable to avoid machining operations on the bearing cup 31. In the first place the bearing cup is made of very hard steel both difficult and expensive to machine. Secondly, any machining operations on the bearing cup have a tendency to weaken the same.

In fabricating assembly 13, I have found that the following method can be practiced to great advantage. Strap 32 is first stamped from a sheet of relatively soft machinable metal, this stamping operation resulting in the shape indicated in Fig. 4 and including the relieved portions 41, arcuate surfaces 36 in their rough unfinished state, and openings 42 for the reception of the fastening screws. It will be noted further that in this stamping operation arcuate depressions 43 are formed in the wall of strap 32 permitting the head of cap screw 26 to engage the strap closely adjacent the outer surface of the bearing cup 31. This however does not appreciably weaken the strap since the arcuate side wall portion 44 extends around in embracing spaced relation to the head of the cap screw, providing the necessary strength. Furthermore, as will be seen, the subsequent welding of the strap to the bearing cup removes all basis for concern in this connection. This strap is then brought into proper relation with respect to bearing cup 31 which has previously been hardened as by a carburizing process and the two welded together preferably in a welding machine of a well known form for carrying out this operation to produce the weld 33 indicated in Fig. 3.

Following this welding operation, arcuate surfaces 36 are next machined to give the same the desired shape and position relative to the axis and the end wall of bearing cup 31. While these surfaces 36 may be formed on the ear portions of the strap in a number of different ways, I have illustrated schematically in Fig. 5, a preferred form of means for carrying out this operation. The bearing cup and strap assembly previously welded together is placed on a spindle 46 and between suitable clamping jaws 47 and 48 of a broaching machine and the broaching tool 49 having arcuate teeth 50 is operated to finish surfaces 36. This broaching machine includes suitable guide means indicated generally at 51 for accurately determining the location of the finished arcuate surfaces 36 relative to the central axis and end wall of the bearing cup.

As an alternative method of forming arcuate surfaces 36 on the strap 32, I have found that in certain instances this may be accomplished in connection with the stamping operation. While this may be satisfactory in certain cases where the stamping operation is carefully controlled and is believed to be novel, it has not proven satisfactory to the degree enjoyed by the above machining operation.

With further reference to the above welding operation, I have found that this can be carried out in a very rapid manner, the only limiting factor being the speed with which the welding operator is able to pick up the assembled structure from its position on the welding machine.

While I have disclosed my invention in connection with a specific embodiment thereof, it is to be understood that I contemplate other and equivalent arrangements as coming within my invention and I desire that the same be defined by the appended claims which should be given a scope as broad as permitted by the prior art.

I claim:

1. The method of manufacturing trunnion bearing assemblies for universal joints wherein accurate axial displacement of the trunnion bearings relative to the axis of rotation of the universal joint and the maintenance of close tolerances in the trunnion bearing cups is of primary importance, which comprises forming the trunnion bearing supporting yoke with circumferentially spaced axially extending abutment surfaces, each of which faces and is displaced the same distance from the said axis of rotation, machine turning a plurality of trunnion bearing cups, heat treating said bearing cups to harden the same, permanently securing soft metal straps upon each of said machined and hardened bearing cups and in thereafter fixing said bearing cup between relatively stationary jaws and work engaging said portions of said straps adapted to register with and to contact said yoke abutment surfaces with a metal cutting broach operating along an axis located at a predetermined distance from the end thrust surface of said bearing, until said portions of the straps are properly shaped to locate the bearing cups at the same radial distance from the axis of rotation when in contact with said abutment surfaces.

2. The method of manufacturing universal joint trunnion bearing cup assemblies wherein there is provided a bearing supporting yoke having arcuately machined circumferentially spaced inwardly facing abutment surfaces, each located at the same distance from the axis of rotation of the yoke, and wherein accurate positioning of the trunnion bearings relative to the axis of rotation of the universal joint and maintenance of close tolerances between the trunnion bearing cups and the trunnions is of primary importance, said method including employing a plurality of cylindrical hard metal bearing cups, die-blanking and forming a plurality of soft metal straps having a generally arcuate central portion and generally radially outwardly extending ear portions, forming, in said die-blanking operation, a pair of notches separating said central portion from said ears, permanently securing the arcuate portion of one of the straps to each of the said bearing cups, and finally broaching arcuate locating surfaces on each of said ear portions, extending from said notches to the outer extremities of the ears; in spaced identical relation on opposite sides of said cups to adapt the same for reception in contact with said above named abutment surfaces, said broaching being confined to said ears.

EDMUND B. ANDERSON.